No. 846,196. PATENTED MAR. 5, 1907.
S. FREAS.
INSERTIBLE TOOTH FOR METAL SAWS.
APPLICATION FILED SEPT. 21, 1906.

Witnesses:
Walter F. Pullinger
Augustus B. Coppes

Inventor
Samuel Freas.
by his Attorneys
Howson & Howson

UNITED STATES PATENT OFFICE.

SAMUEL FREAS, OF TRENTON, NEW JERSEY, ASSIGNOR TO HENRY DISSTON & SONS, INCORPORATED, OF PHILADELPHIA, PENNSYLVANIA, A CORPORATION OF PENNSYLVANIA.

INSERTIBLE TOOTH FOR METAL SAWS.

No. 846,196.     Specification of Letters Patent.     Patented March 5, 1907.

Application filed September 21, 1906. Serial No. 335,614.

*To all whom it may concern:*

Be it known that I, SAMUEL FREAS, a citizen of the United States, residing at Trenton, New Jersey, have invented certain Improvements in Insertible Teeth for Metal Saws, of which the following is a specification.

The object of my invention is to provide means for readily and securely fastening insertible saw-teeth in saw-blades.

My invention is particularly adapted to circular saws for sawing metal.

Figure 1:
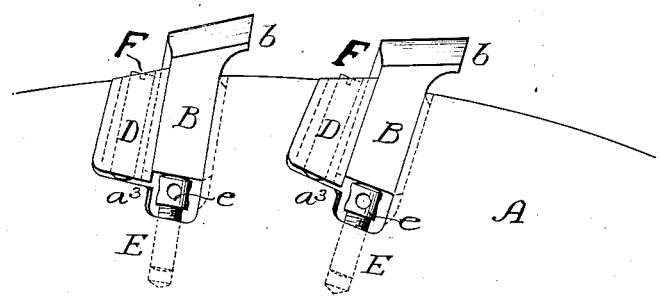
Figure 2:
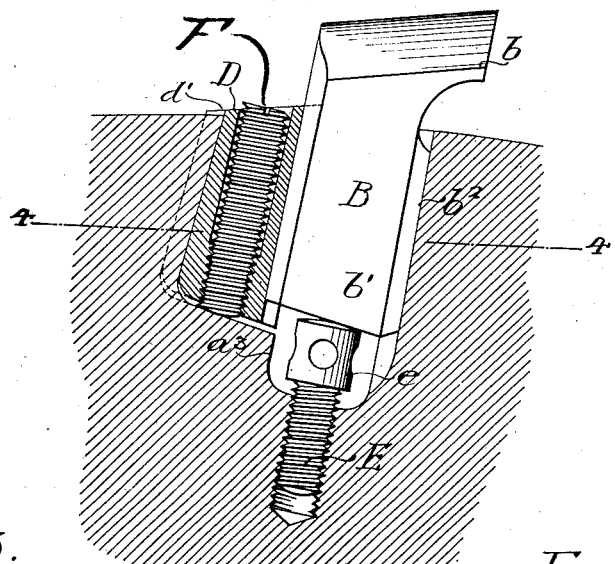
Figure 3:
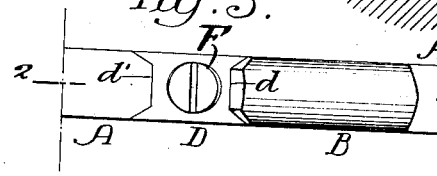
Figure 4:
Figure 5:
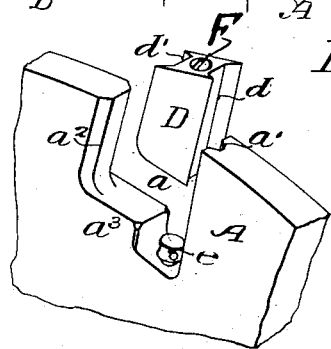
Figure 6:
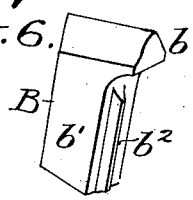

Referring to the accompanying drawing, Figure 1 is a side view of sufficient of a circular saw to illustrate my invention. Fig. 2 is a sectional view on the line 2 2, Fig. 3. Fig. 3 is an edge view. Fig. 4 is a sectional view on the line 4 4, Fig. 2, and Figs. 5 and 6 are views showing the parts detached.

A is the blade or body of a circular saw, having recesses $a$, shaped as shown.

B is the saw-tooth, and D is the wedge, which is mounted in the recess $a$ back of the shank of the tooth. The point $b$ of the tooth can be of any shape desired without departing from my invention. The shank $b'$ of the tooth in the present instance has a V-shaped tongue $b^2$ extending the length of the shank at the front edge, which meshes with a V-shaped groove $a'$ in the wall of the recess $a$. The back edge of the shank $b'$ of the tooth is beveled to fit the groove $d$ in the front edge of the wedge D. The rear edge $d'$ of the wedge is also grooved to receive the beveled edge $a^2$ of the wall of the recess $a$.

A screw E, having a perforated head $e$, is screwed into an opening in the body or blade A of the saw, the head resting under the saw-tooth, as shown in Fig. 2. By turning the screw E the tooth can be adjusted longitudinally.

The opening back of the tooth for the wedge is tapered, being narrower at the periphery of the blade than at the base of the recess, and the wedge is of a greater width at the base than at the outer edge, so that the wedge is forced outward to fasten the tooth to the blade. In order to force the wedge outward, I mount an adjusting-screw F in a longitudinal screw-threaded opening in the wedge, as shown in Fig. 2, the inner end of the screw resting on an abutment $a^3$, forming part of the base of the recess $a$.

On turning the screw F in one direction the wedge will be forced toward the periphery of the blade and will securely fasten the tooth to the blade. By turning the screw in the opposite direction it will be backed off of its seat, and then by tapping the wedge it will be forced inward, and the tooth will be released.

I preferably make the shank of the tooth slightly tapered, it being wider at the base than at the throat, so that there is no tendency for the tooth to draw out by the action of the saw as it cuts into the metal. Any pull on the tooth will cause the wedge to more firmly grip the tooth.

By my improvement the teeth of the saw can be mounted very close together, which will prevent the jarring of the mechanism of the saw. The teeth can be readily inserted or removed or adjusted, and when in place they are rigidly held, so as to withstand the strains to which they are subjected.

While my invention is particularly adapted for use in circular saws for sawing metal, it will be understood that the invention can be used in any type of saw for sawing any material.

I claim—

1. The combination of the recessed body of a saw, a tooth mounted in said recess and of a wedge also mounted in the recess back of the tooth, the wedge being wider at the inner end than at the outer end, substantially as described.

2. The combination of the recessed body of a saw, a tooth mounted in said recess, a wedge also mounted in said recess back of the tooth, said wedge being wider at the inner end than at the outer end, and an adjusting-screw passing through a threaded opening in the wedge and bearing upon the base of the recess, substantially as described.

3. The combination of the recessed blade of a saw, a tooth having a point and a shank, said shank being slightly tapered, being wider at the base than at the throat, a wedge in the recess back of the tooth, said wedge being wider at the inner end than at the outer end, substantially as described.

In testimony whereof I have signed my name to this specification in the presence of two subscribing witnesses.

SAMUEL FREAS.

Witnesses:
    E. B. ROBERTS,
    W. C. BURKHOLDER.